United States Patent [19]
Rumpf

[11] 3,833,781
[45] Sept. 3, 1974

[54] SEAT BELT BUCKLE SWITCH WITH KNIFE AND CLIP CONTACT ASSEMBLY

[75] Inventor: Robert J. Rumpf, Grosse Pointe, Mich.

[73] Assignee: The Firestone Tire & Rubber Company, Akron, Ohio

[22] Filed: Sept. 10, 1973

[21] Appl. No.: 395,745

[52] U.S. Cl. ......... 200/61.58 B, 24/230, 180/82 C, 200/162, 200/254
[51] Int. Cl. ...................... H01h 3/20, H01h 1/42
[58] Field of Search ......... 24/77 R, 230 A–230 AV; 180/82 C; 200/15, 10 F, 61.58 R, 61.58 B, 162, 163, 166 E; 340/52 E

[56] References Cited
UNITED STATES PATENTS

| | | | |
|---|---|---|---|
| 3,166,146 | 1/1965 | Shaw | 180/82 C |
| 3,449,800 | 6/1969 | Fisher | 24/77 R |
| 3,570,621 | 3/1971 | Hampton | 180/82 C |
| 3,760,135 | 9/1973 | Nevett | 200/61.58 B |

*Primary Examiner*—James R. Scott
*Attorney, Agent, or Firm*—Miller, Morriss, Pappas & McLeod

[57] ABSTRACT

A switch for safety buckles which is concealed from external tampering and view by location in the channel frame of the buckle and which is sensitive to the closure of the latch element on the tongue element. The switch comprises a blade and receiver, the blade being responsive to the latch position and by substitution of the receiver element the switch is convertible from normally open to normally closed. A harness jacket houses the electrical leads and the switch elements, projecting the switch elements into the channel frame housing. An actuating leaf projects from beneath the latch element and grips the blade of the switch. A cocking element or lever engageable by the tongue on insertion in the buckle is provided and is movable on closure of the latch urged by the latch spring and selectively opening or closing the switch.

4 Claims, 13 Drawing Figures

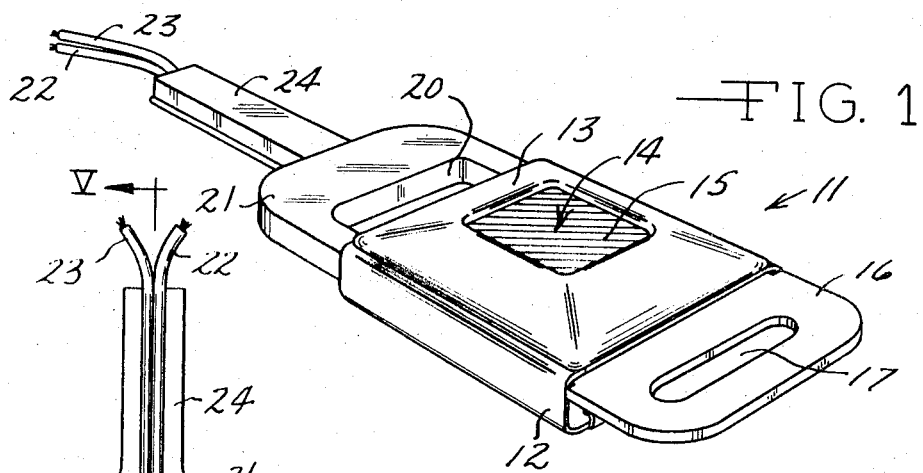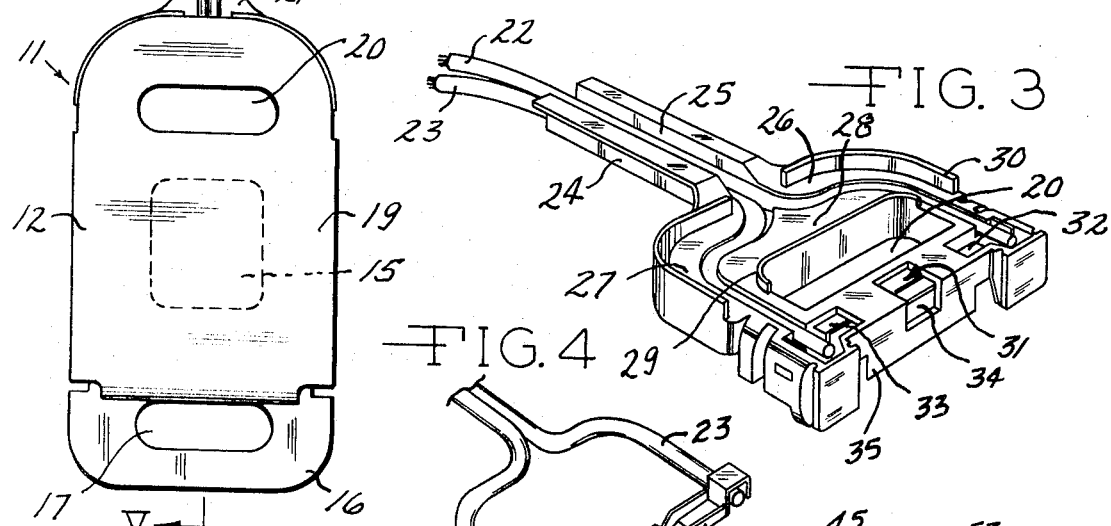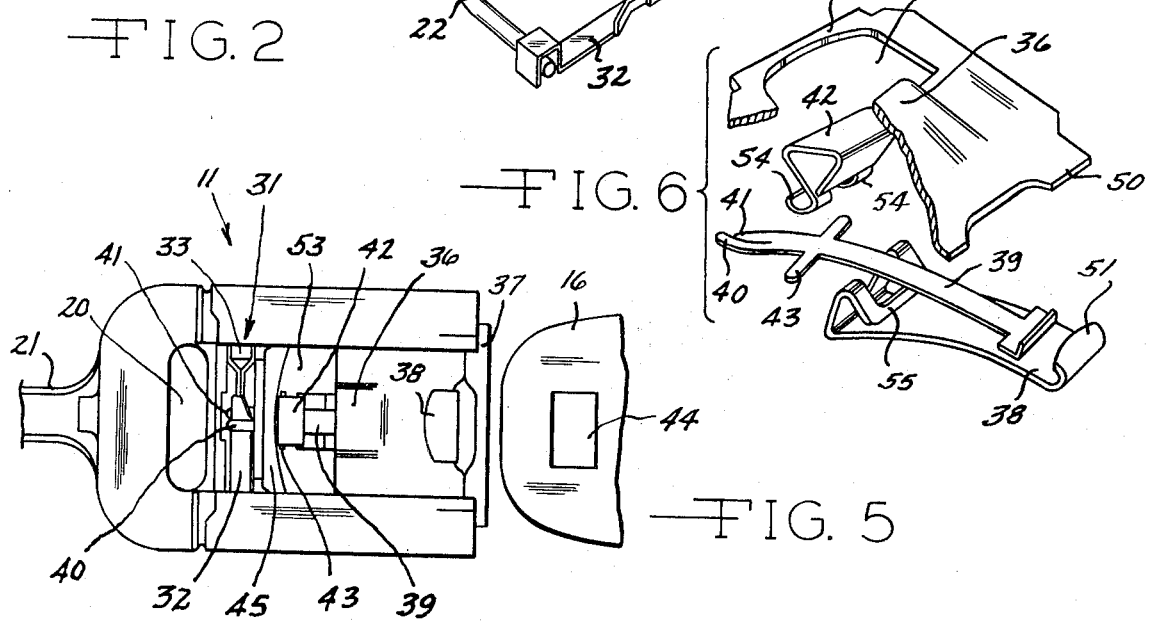

SEAT BELT BUCKLE SWITCH WITH KNIFE AND CLIP CONTACT ASSEMBLY

The present invention is a new and improved switch for safety buckles in safety belts for sensing the open or closed condition of the lock latch. The swing is desired to electrically sense the locked or unlocked condition of the buckle so that the condition can be integrated into a selected safety logic circuit assuming that the buckle and the seat belt associated therewith are connected. With the desirability of signal circuits and prevent circuits or interlocks requiring that driver and passengers "buckle up" before starting the vehicle, there has been an increased demand for positive acting tamper-proof switches. The present device is directed toward providing an improved seat belt buckle switch which is simple, economical, hidden, trouble-free and especially adaptable to use with push button type buckles such as exemplified in the U.S. Pat. No. 3,449,800 to Robert C. Fisher.

The prior art buckle switches are generally represented in the following U.S. Pat. Nos.: 3,624,601, 3,570,621, 3,633,697, 3,440,714, 3,281,818, 3,269,483, 3,237,710, 3,200,370 and 3,166,146. As will be appreciated, the present switch structure is much simpler and much more positive in its response to the closure condition sensed by the latch position and where actuation of the switch utilizes the latch spring. The principal object is to provide a compact condition sensing switch responsive to the condition of the latch plate in a seat belt buckle and which is concealed within the buckle so as to make the switch relatively tamper-proof.

Another object is to provide a positive latch buckle sensing switch actuated only when tongue is fully latched which is easily changeable from normally open to normally closed and responsive to the latch movement.

Another object is to provide a switch adaptable to use in safety interlock circuits where the spring elements are extensions of the latch spring arrangements assuring powerful snap action and the consequent opening and closing of the switch involves a wiping and cleaning action at the blade contacts as well as a fast breakaway in avoidance of harmful arcing.

Still another object is to provide a switch for electrical interlock which adapts nicely to insertion in the Fischer push button type (U.S. Pat. No. 3,449,800) buckles without major styling or mechanical changes.

Other objects including simple encasement and assembly of leads and components will be obvious as the description proceeds.

IN THE DRAWINGS

FIG. 1 is a perspective view of a seat belt buckle which includes a switch in accord with the present invention and sensing the closed latch position.

FIG. 2 is a bottom plan view of the buckle and switch construction shown in FIG. 1.

FIG. 3 is a perspective view from the cavity side of the switch housing of the present invention and indicating the disposition of the electrical leads.

FIG. 4 is a perspective of the switch elements of the present invention connected to the ends of the electrical leads but removed from the switch housing as seen in FIG. 3.

FIG. 5 is a top plan view of the buckle as seen in FIG. 1 but with the ornamental push button cover removed and indicating the location of the tongue plate prior to entry into the buckle.

FIG. 6 is a partially exploded perspective of the latch element, latch spring, switch actuator arm and tiltable (displaceable) tongue plate interference stop element.

Figure 11:
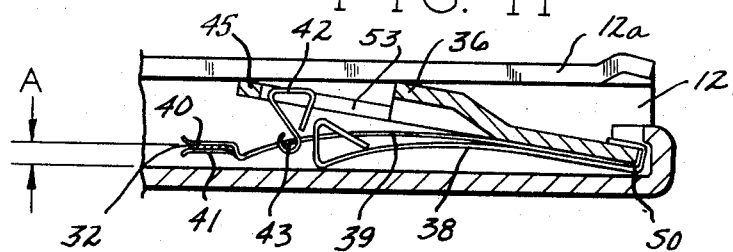
Figure 12:
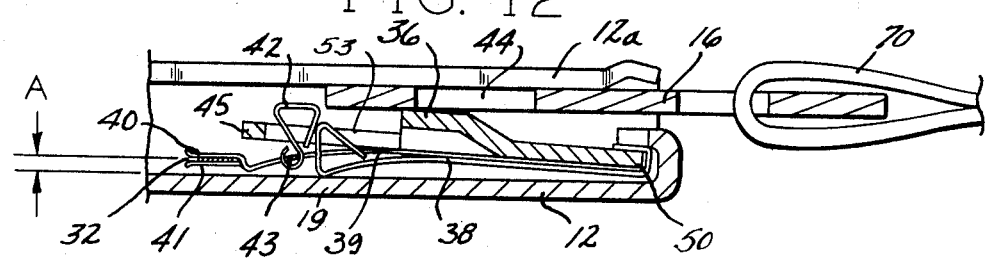
Figure 13:
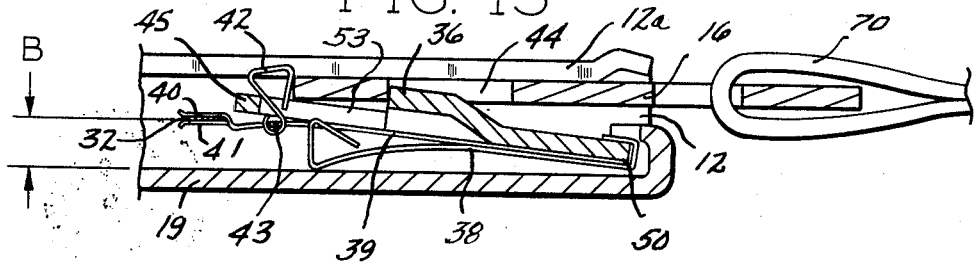

FIGS. 11, 12 and 13 are cross-section side elevation views through the buckle taken on line V—V of the FIG. 2 and showing the actuating arm shifting position in accord with the tongue position and latch position in the buckle. In FIG. 11, the buckle is at rest and the tongue has not been inserted. In FIG. 12 the latch has been depressed during entry of the tongue. In FIG. 13 the tongue has been latched and the sensor element has been displaced and tilted by the action of the leading edge of the tongue and the latch has closed causing the actutor lever to displace itself the distance (b) from the belt or web of the buckle.

GENERAL DESCRIPTION

In general, the switches of the present invention are concealed in the webbing connection end of a seat belt buckle of the push button type (U.S. Pat. No. 3,449,800) comprising a channel base with inturned leg ends, a spring loaded latch element and lever means acted upon by the push button to depress the latch against the spring. The tongue plate of such a buckle enters the buckle above the latch plate and depresses the latch as it enters guided on inturned flange tracks which are an integral part of the channel base.

By placing a displaceable sensor element in the path of the incoming tongue and connecting the sensor to an actuating arm for switch manipulation, the initial displacement of the sensor and consequent powerful spring closure of the latch causes a substantial lever shift of the actuator arm following the movement of the latch and one of the blade elements in the switch is also displaced in a straight-line snap action. On depression of the latch, the system is restored to a rest position, with the actuator arm lowered and the sensor in position for contact with the blade on the next insertion of the tongue plate. The displaced blade is a male blade which slips into and out of engagement between the blade receiving cheeks of a female blade element. The female blade is formed to be relatively rigid in its receiver position. The male blade is flexed in its length by the action of the actuator arm. Since the male blade is moved upwardly as the latch locks into the tongue plate, it may move into or out of closed engagement depending on the position of the female receiver blade. The blades of a copper-beryllium alloy or the like selected to undergo repetitive oscillating action without failure and, as will be seen, the closure and release are fast and wiping in avoidance of arcing, blade deterioration, and contamination. The snap action occurs as a consequence of the quick release of the latch element as the latch spring pops the latch into the tongue latch recess. As will be seen, the motion does not occur unless, preliminarily, the nose end of the tongue has displaced the sensor.

The switch case and cover is configured to clip into place on the webbing side of the buckle and to blend with and be a part of the webbing connector slot in the case integral extension. The case conducts, conceals and protects the electrical leads connected to the switch leaves. The case also orients the switch elements and holds them in position for selected motion by the action of the sensor and the actuator arm. The actuator arm projects through the switch case and is connected to the male leaf element.

SPECIFIC DESCRIPTION

Referring to the drawings and with particularity to the FIG. 1 thereof, a buckle 11, of a type generally in accord with the teachings of U.S. Pat. No. 3,449,800 is shown. The buckle 11 has a channel base 12, an ornamental cover 13 having an opening 14 therethrough and having a push button 15 accessible through the opening 14. The tongue plate 16 is seen inserted in the buckle 11 and is locked into place until the push button 15 is depressed, whereupon the tongue plate 16 is released. The webbing slot 17 provided in the tongue plate 16 is for attachment of webbing or fabric belting (not shown) as commonly known in the safety belt art. The depression of the push button 15 releases a latch element which, as will be seen, is spring biased toward closure. Integral with the base 12 is a slotted extension 18 of the web portion 19 of the channel shaped base 12 (see FIG. 12). The slot 20 in the extension 18 of the base 12 provides means for attachment of the buckle 11 to webbing in selected harness arrangements. The switch case 21 snaps over the extension 18 in a registering relationship so that the slot 20 is available for attachment of webbing to the buckle 11. Accordingly, the switch case 21 closes the end of the buckle 11 and as will be seen orients the switch elements for manipulation from the interior of the buckle 11. The switch case 21 also conducts the leads 22 and 23 in a concealed manner through the interior tailpiece 24 of the switch case 21, and to contact with the switch elements, as will be seen. The switch case 21 is preferably made from a tough and dimensionally stable resin material with good dielectric strength and capable of being injection molded with resonably good accuracy. The FIG. 3 best illustrates the inner configuration of the switch case 21. The tailpiece 24 provides a conducting channel 25 in which the leads 22 and 23 rest. The channel 25 is bifurcated forming symmetrical branch channels 26 and 27 around a control core 28 in symmetrical relation around the opening 20. The perimetric rim-like extensions 29 (external) and 30 (internal around opening 20) extend for the thickness of the web 19 of the base 12 and thereby snap into position on the extension 18 as the switch case 21 is extended into the buckle base 12 at the end thereof opposite the removable or releasable tongue plate 16. Hence, the rim extensions provide locators for the switch case 21 and snap-in retainers. A housed transverse cavity 31, transverse of, but connected to the subchannels 26 and 27 is provided in the case 21 into which the switch elements 32 and 33 are inserted and each are connected, respectively, to the leads 22 and 23 as by a soldered, crimped or other electrically sound connection providing suitable electrical conductivity at the connection of lead to switch elements. A centrally located access opening 34 is provided through the end wall 35 of the housing cavity 31 in case 21. As will be seen, the opening 34 accommodates the actuator arm to shift the switch elements 32 and 33. In FIG. 4 the switch elements 32 and 33 are shown connected to the leads 22 and 23 respectively, in the closed position as prepared for insertion into the cavity 31 where the switch element 32 and 33 are held in place in snap-in shouldered relation.

As thus described, the switch case 21 is snapped into position with the cavity 31 in its transverse housing with back wall 35 residing in the channel base 12 of the buckle 11 and retained in position by the rim elements 29 and 30 sprung into position on the base extension 18. This is best seen in FIG. 5 with the ornamental cover 13 removed to reveal the latch 36 hinged to the rolled edge 37 of the base 12 and biased upwardly by the action of the latch spring 38. The latch spring 38 extends as a humped leaf beneath the latch element 36 and cradles therebetween a resilient actuator arm or element 39. The tip of the arm 39 is bifurcated so that the resultant tips 40 and 41 operably connect with the male leaf element 32. A sensor block 42 is also connected to the arm 39 in pivotal relation by the trunnion extensions 43 and the sensor block 42 extends upwardly in an interference position with regard to the entry of the tongue plate 16. On insertion of the tongue plate 16 the sensor 42 is moved towards the left as viewed in FIG. 5 and when the latch opening 44 in the tongue plate 16 is in registry with the latch 36 (depressed by entry) then the latch 36 locks in the opening 44 preventing withdrawal of the tongue plate 16 and causing actuation of the switch elements 32 and 33 because of movement of the actuator arm 39. Release occurs when the push button 15 is depressed and thereby causes the latch 36 to be tilted downwardly against the bias of spring 38, the button 15 acting against the lever extension 45 of the latch 36. As thus described, the change in position of the switch elements 32 and 33 occurs in response to locking with the tongue plate 16 in place and the snap-action of the switch is in accord with the bias force of the buckle operating spring 38. This occurs because of the lineal displacement of the sensor 42 by engagement with the tongue plate 16. On release of the tongue plate 16 by depression of the push button 15 acting on the bias of spring 38, the switch reverses its operation from normally closed to normally open or the reverse from normally open to normally closed depending on the logic of the interlock circuitry.

By reference to FIG. 6, the latch 36 is positioned in assembly sequence above the sensor 42, the switch actuator arm 39 and the spring 38 which applies operating bias to the latch 36 and the actuating arm 39 and connected sensor 42. The latch 36 is pivotal along the edge 50 and the spring 38 is provided with a hook portion 51 which is crimped to the latch 36 at the pivot point as represented by the edge 50 and in the pocket notch 52.

For purposes of appreciating the function of the latch 36, the lever extension 45 may be viewed as the bearing element against which the push button 15 acts. The opening 53 in the latch 36 allows the sensor 42 to extend upwardly therethrough to an interference contact position with the tongue plate 16 as previously described. The trunnion extensions 43 of the resilient (beryllium-copper) arm 39 nest in the pivotal cradles 54 of the sensor 42 so that as the sensor (having a triangular cross section) is pushed aside by entry of the tongue plate 16, then the arm 39 is held down on the fulcrum 55 of the spring 38 until the latch 36 powered by spring 38 depressed by the entering tongue plate 16 springs into the latch opening 44. At the tip end of the arm 39 the arm is bifurcated longitudinally to form the tips 40 and 41 which grip one of the switch leaf elements 32 and 33. Hence, when the spring 38 drives the latch 36 into the opening 44 in the tongue plate 16, a snap action is imparted to the switch element 32 or 33 driving it upwardly to open or close the switch elements 32 and 33. Since the knife-like form of the interrelationship of switch elements 32 and 33 is present, the motion is fast and wiping, both motions assuring good switch performance and adjustment to wear with good cleaning action.

Figure 7:
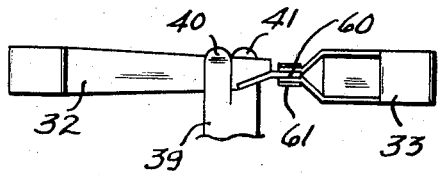
FIG. 7 and 8 are end elevation views of the switch blade elements and indicating the closed and open positions of a normally closed switch in accord with the present invention.
Figure 8:
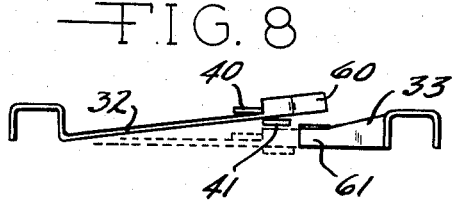

FIGS. 7 and 8 best show normally closed form of the switch elements and the switch male element 32 being popped into the open position shown in FIG. 8 when the latch 36 closes and locks on the tongue plate 16 as previously described. The male blade 60 closes between the cheeks 61 of the female element 33 when the tongue plate 16 is released on depression of the push button 15.

Figure 9:
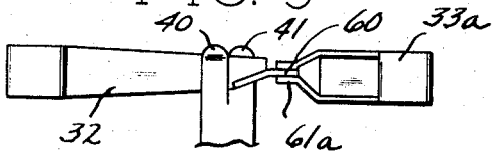
FIGS. 9 and 10 are end elevation views of the switch blade elements and indicating the closed and open positions of another switch in accord with the present invention which is normally open.
Figure 10:
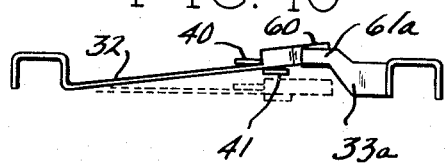

FIGS. 9 and 10 show a normally open form of the switch elements 32 and 33a. In this arrangement, the female element 33a is substituted in a form so that the goose neck portion 62 having cheeks 61a receives the male blade 41 at its elevated position. This arrangement allows the switch structure to be used with only a minor modification to adapt itself to any logic environment of normally open or normally closed without complete retooling.

The FIGS. 11, 12 and 13 best show the functioning of the switch actuating mechanism where the actuator arm 39 is nested on the spring 38 and the tips 40 and 41 grasp the male switch leaf 32 therebetween. The latch 36 is pivotal in the case 12 at the edge 50 and the bias of spring 38 urges the latch 36 into the position shown and the sensor 42 awaits impingement on the leading edge of tongue plate 16. The male switch leaf 32 is displaced as indicated by the increment A.

In FIG. 12 the tongue plate 16 with webbing 70 attached thereto is inserted in the case 12 below the flange 12a and slides along the ramp portion 71 of the latch element 36 forcing the latch 36 downwardly against the spring 38 and pivotally on the edge 50. Note that the motion places the tongue plate 16 in a path to contact the sensor 42 but that the arm 39 and tips 40 and 41 retain their original displacement position substantially as seen in FIG. 11.

In FIG. 12 the insertion path of the tongue plate 16 has taken the position of registry as between latch 36 and opening 44 so that the spring 38 drives the latch 36 into locking relation. Partially locked condition is shown. The sensor 42 has also been moved by the tongue plate 16 and its displacement draws the arm 39 upwardly under the latching force of the spring 38 and displaces the arm as shown at B only when the latch 36 is locked in the opening 44.

When and if the latch 36 is depressed to release the tongue plate 16, then the condition of FIG. 12 is restored while the plate 16 is withdrawn and the A displacement from the web portion or floor 19 obtains and the male switch leaf 32 is restored to its normal rest condition, closed or open as needed by the logic.

Repetitive testing shows excellent switch performance and the switch as described is simple and trouble-free. Unlike other switch structures proposed for the indicated purpose, the disclosed switch employs the sensing of the latch closure to accomplish actuation. The snap action and the wiping action both assure good electrical performance.

Having thus described my invention and an operative embodiment thereof, others skilled in the art will perceive obvious changes, modifications and improvements and such changes, modifications and improvements are intended to be included herein limited only to the scope of my hereinafter appended claims.

I claim:

1. A switch for seat belt buckles, said buckles having a buckle housing, a latch element pivotal in said housing and a belt tongue insertable and removable from said housing, said switch comprising:
   a switch case insertable in said buckle housing;
   leads in said switch case;
   knife type switch elements, one male and one female secured to said leads and extending transversely across said switch case and one of said switch elements being movable;
   an actuator arm secured in said buckle housing bifurcated at one end and by said bifurcations being connected to the movable of said switch elements;
   a sensor element pivotally extending from said actuator arm;
   spring bias means beneath said arm and selectively acting on said arm; and
   a latch structure also acted upon by said spring and actuating said arm only when said sensor element is moved.

2. A switch for seat belt buckles of the push button type having a latch pivotal at one end of said buckle and a spring biasing said latch toward closure on a belt tongue plate comprising:
   a switch case secured to said buckle and enclosing electrical leads and having a portion defining a transverse cavity protruding into said buckle;
   a male and a female switch element, the male element having a blade end and the female element having blade receiving cheeks and one of said switch elements being movable toward and away from closure on the other of said elements and said switch elements being located, retained and oriented in said transverse cavity of said case and each connected to one of said leads in said case;
   an actuator arm extending longitudinally from said buckle and into said transverse cavity of said case and connected to said movable of said switch elements;
   a sensor pivotally on said arm and requiring displacement before said actuator arm is movable; and
   spring means acting on said arm to selectively move said switch when said sensor has been displaced.

3. A switch for seat belt buckles of the push button type having a latch pivotal at one end comprising:
   a buckle housing;
   a switch case secured to said buckle housing and containing leads and said switch case closing one end of said buckle and extending thereinto;
   a spring in said buckle housing;
   a latch in said buckle housing acted upon by said spring;

a resilient actuator arm overlaying said spring and extending into said switch case;

switch elements of the knife type transversely across said buckle and one of said switch elements connected to said actuator arm; and a sensor secured to said actuator arm and extending upwardly therefrom in said buckle, said sensor requiring displacement before said latch displaces said actuator arm.

4. A safety belt buckle and switch combination comprising:

a channel shaped buckle case open at the ends;

a latch element in said buckle case and pivoted thereto at one end;

a spring urging said latch upwardly in said buckle case in a bias toward locking;

a tongue plate entrant to said buckle case above said latch element and having an opening into which said latch protrudes when said opening is in registry with said latch element;

a switch case closing said buckle case at one end thereof opposite said latch pivotal end and said switch case extending into said buckle case and defining therein a transverse switch cavity into which electrical leads extend;

a fixed and a movable switch element in said cavity and each operably connected to one of said leads, the movable of said switch elements including a blade insertable and removable from receiving cheeks in the fixed of said switch elements;

an actuator arm beneath said latch and acted upon by said spring and extending into said cavity and connected to the movable of said switch elements, said arm including trunnion extensions midway of its ends; and a sensor block pivotally secured to said actuator arm at said trunnions and in an interference path with said tongue plate, said sensor block requiring displacement whereupon said spring in closing said latch actuates the movable of said switch elements by movement of said arm.

* * * * *

UNITED STATES PATENT OFFICE
CERTIFICATE OF CORRECTION

Patent No. 3,833,781            Dated September 3, 1974

Inventor(s) Robert J. Rumpf

It is certified that error appears in the above-identified patent and that said Letters Patent are hereby corrected as shown below:

Column 1, line 6, "swing" should be -- switch --

Column 2, line 27, "actutor" should be -- actuator --

Column 3, line 32, "Fig. 12" should be -- Fig. 2 --

Column 3, line 47, "resonably" should be -- reasonably --

Column 4, line 9, "element" should be -- elements --

Signed and sealed this 1st day of April 1975.

(SEAL)
Attest:

RUTH C. MASON
Attesting Officer

C. MARSHALL DANN
Commissioner of Patents
and Trademarks